United States Patent
Kröning et al.

(10) Patent No.: US 6,299,226 B1
(45) Date of Patent: Oct. 9, 2001

(54) BUMPER

(75) Inventors: Achim Kröning; Hui Wang; Peter Goer; Dariusz Straznikiewiecz, all of Paderborn (DE)

(73) Assignee: Benteler AG, Paderborn (DE)

( * ) Notice: Subject to any disclaimer, the term of this patent is extended or adjusted under 35 U.S.C. 154(b) by 0 days.

(21) Appl. No.: 09/668,814

(22) Filed: Sep. 23, 2000

(30) Foreign Application Priority Data

Aug. 10, 2000 (EP) .................................................. 00117134

(51) Int. Cl.$^7$ .............................. B60R 19/04; B60R 19/34
(52) U.S. Cl. ........................ 293/120; 293/133; 293/152; 293/155
(58) Field of Search .................................. 293/120, 130, 293/132, 133, 149, 151, 152, 153, 155; 256/13.1; 404/6, 10

(56) References Cited

U.S. PATENT DOCUMENTS

| | | | |
|---|---|---|---|
| 1,709,483 | * | 4/1929 | Offenhauser ........................ 293/107 |
| 3,830,539 | * | 8/1974 | Yoshie et al. ....................... 293/149 |
| 3,912,295 | * | 10/1975 | Eggert, Jr. ........................... 280/784 |
| 3,924,888 | * | 12/1975 | Butcher et al. ...................... 293/150 |
| 4,079,975 | * | 3/1978 | Matsuzaki et al. .................. 293/132 |
| 4,193,621 | * | 3/1980 | Peichl et al. ........................ 293/142 |
| 4,372,701 | * | 2/1983 | Watanabe ............................ 403/24 |
| 4,408,790 | * | 10/1983 | Shimoda et al. .................... 293/122 |
| 4,468,052 | * | 8/1984 | Koike ................................... 280/784 |
| 4,950,031 | * | 8/1990 | Mizunaga et al. .................. 296/189 |
| 4,961,603 | * | 10/1990 | Carpenter ............................ 293/102 |
| 5,498,044 | * | 3/1996 | Bovellan et al. .................... 293/120 |
| 5,785,367 | * | 7/1998 | Baumann et al. ................... 293/133 |
| 5,803,514 | * | 9/1998 | Shibuya et al. ..................... 293/133 |
| 6,042,163 | * | 3/2000 | Reiffer ................................ 293/155 |

FOREIGN PATENT DOCUMENTS

| | | | |
|---|---|---|---|
| 19700022-A1 | * | 7/1998 | (DE) . |
| 41413 | * | 12/1981 | (EP) .................................... 293/152 |
| 0050722-A1 | * | 6/1982 | (EP) . |
| 2022212-A | * | 12/1979 | (GB) ................................... 293/132 |
| 2328654-A | * | 3/1999 | (GB) . |
| 55-31610-A | * | 3/1980 | (JP) ..................................... 293/155 |
| 63-2756-A | * | 1/1988 | (JP) ..................................... 293/149 |

* cited by examiner

Primary Examiner—Joseph D. Pape
Assistant Examiner—Paul Chenevert
(74) Attorney, Agent, or Firm—Friedrich Kueffner

(57) ABSTRACT

A bumper for a motor vehicle has a transverse support and impact damping members connected to the transverse support, wherein the transverse support is fastened transverse to longitudinal supports of a motor vehicle frame via the impact damping members to the longitudinal supports. The transverse support is an open profiled member opening in a direction toward the impact damping members and has an upper shell and a lower shell. The transverse support has a front stay with an upper longitudinal edge and a lower longitudinal edge, wherein each one of the upper and the lower longitudinal edges has a leg extending toward the impact damping members. Each leg has a vertical portion and an angled reinforcement flange pointing toward the vehicle frame. Each leg is slanted inwardly between 5 degrees and 45 degrees from the longitudinal edges to the vertical portions.

5 Claims, 1 Drawing Sheet

U.S. Patent        Oct. 9, 2001        US 6,299,226 B1
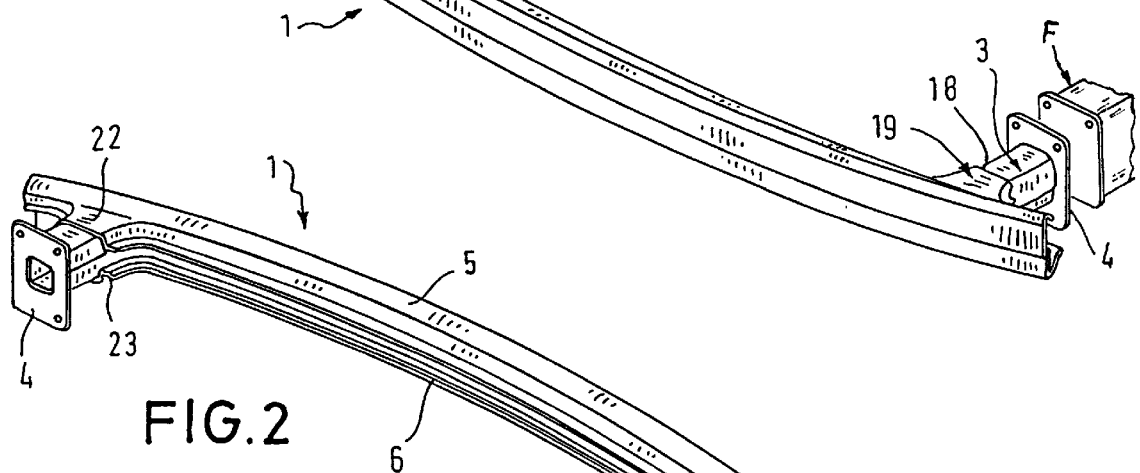
FIG.1
FIG.2
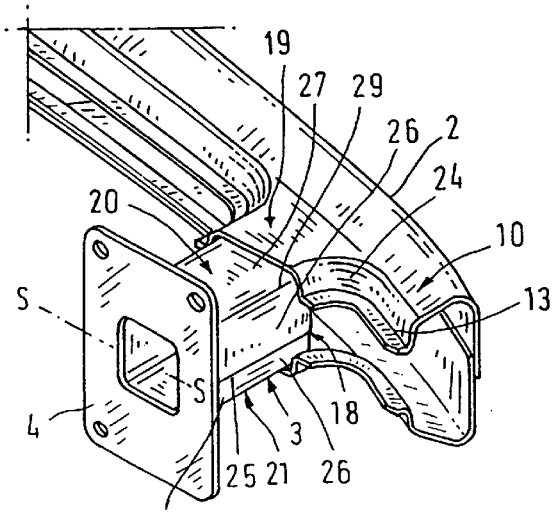
FIG.3
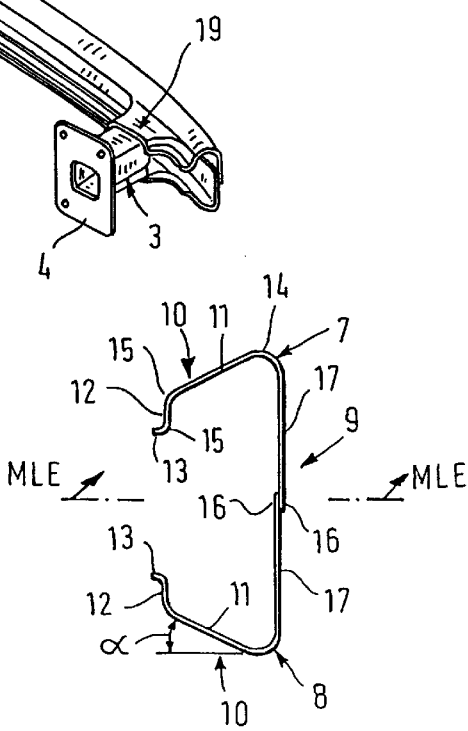
FIG.4

BUMPER

BACKGROUND OF THE INVENTION

1. Field of the Invention

The invention relates to a bumper for motor vehicles comprising a transverse support to be mounted transversely to the longitudinal supports of the motor vehicle frame by means of impact damping members.

2. Description of the Related Art

Bumpers are arranged transversely at the front and rear of a motor vehicle between the plastic covering enclosing the car body and the frame of the motor vehicle. They are provided in order to prevent damage to the motor vehicle structure upon impact at low speed. For this purpose, impact damping members, so-called crash boxes, are provided between the transverse support and the longitudinal supports of the motor vehicle. The impact damping members are designed to absorb the energy resulting from an impact by converting the energy into deformation work.

Different types of bumpers or bumper arrangements are known. For example, German patent application DE 197 00 002 A1 discloses a bumper arrangement with a rigid support which is partly formed as a hollow support and fastened by means of an impact damping members to the front ends of the longitudinal supports of the chassis, respectively, on opposite sides of the longitudinal center axis of the motor vehicle. The transverse support is connected to a deformable bumper shell.

Similar proposals can be taken from British patent application GB 2 328 654 A or European patent application EP 0 050 722 A1.

Especially in the case of the rear bumper, the free deformation stroke which is available for energy absorption is short as a result of the motor vehicle construction because the available space is limited by the trunk cover. Therefore, it is desirable to form the transverse support already as a deformation element positioned upstream of the crash boxes in the direction of impact in the manner of a serial connection in order to provide energy absorption as high as possible from the beginning of the impact. Such systems are comprised usually of a transverse support which is embodied as a closed hollow chamber profile or as a closed pressed shell part, as is disclosed also in the above mentioned references. The weight of such a construction is relatively high because of the amount of material used. Also, painting or surface protection of the transverse support is complex because of the closed construction.

SUMMARY OF THE INVENTION

It is an object of the present invention to improve a bumper by means of a weight-reducing construction wherein the transverse support has a deformation capability and contributes to energy absorption during impact in cooperation with the crash boxes.

In accordance with the present invention, this is achieved in that the transverse support is configured as an open profiled member that is open toward the impact damping members and is comprised of an upper shell and a lower shell, wherein a rearwardly oriented leg adjoins the upper longitudinal edge and the lower longitudinal edge of the front stay of the transverse support, respectively, which leg is comprised of a vertical portion and an angled reinforcement flange pointing toward the vehicle frame.

According to the invention, the transverse support is a profiled member that is open in a direction toward the impact damping members and is comprised of an upper shell and a lower shell which are connected to one another. The thus formed transverse support has a front stay and a leg oriented toward the rear extends from the upper and lower longitudinal edges of the front stay, respectively. This leg is embodied as a deformation fold with a vertical section and an adjoining angled reinforcement flange pointing toward the frame of the motor vehicle. Preferably, the vertical section, with respect to the open profiled member is pulled inwardly and the reinforcement flange is oriented approximately at a right angle to the vertical section.

Because of the open profiled member of the transverse support, a considerable weight reduction is achieved. Moreover, material can be saved. The shaping of the two-part transverse support with fold formation and flange formation imparts a deformation behavior to the transverse member that is comparable to that of an impact damping member.

Advantageously, the upper shell and the lower shell, relative to the longitudinal center plane, are arranged symmetrically to one another. The upper shell and the lower shell can then be formed as identical components with identical cross-section configuration. This means that tool costs can be saved. The tailored optimized design of the profile furthermore contributes to an improved material use.

The upper shell overlaps portions of the lower shell when assembled to form the transverse support, and the two shells are connected, for example, by welding.

Receiving members for attaching the impact damping members are integrated into the transverse support. The receiving members are pocket-shaped and are introduced during the pressing or stamping process into the upper shell and the lower shell. In this context, the shell design can be adjusted to different impact damping configurations.

In this connection, a transverse member whose receiving members have length portions which are parallel to the upper side and the lower side of the impact damping members is considered to be advantageous. These length portions have a continuous transition into the longitudinal legs of the upper and lower shells. The receiving members are formed by partially widening the legs at the upper shell and the lower shell. In the finished bumper, the receiving members receive the end portions of the impact damping members in a positive-locking way.

Expediently, the impact damping members are also formed as a two-part shell with an upper shell and a lower shell. The upper shell and the lower shell are connected to one another via the longitudinal edges of their lateral legs.

The impact damping members are open in the direction toward the transverse support. Their end faces facing the longitudinal supports of the vehicle have a connecting flange for attachment to the longitudinal supports, respectively.

BRIEF DESCRIPTION OF THE DRAWING

In the drawing:

FIG. 1 is a perspective illustration of a bumper according to the invention;

FIG. 2 is a rear view of the bumper according to the invention;

FIG. 3 is portion of the bumper with illustration of the connecting area between the transverse support and the impact damping member; and FIG. 4 is a simplified illustration of the cross-section of the transverse support according to the invention.

DESCRIPTION OF THE PREFERRED EMBODIMENTS

The FIGS. 1 and 2 show a bumper 1 for a motor vehicle. It comprises a transverse support 2 that can be transversely connected to the longitudinal supports F of the motor vehicle frame. Impact damping members 3 are provided as energy-absorbing deformation elements between the longitudinal supports F and the transverse support 2. For attachment to the longitudinal supports F, the impact damping members 3 have connecting flanges in the form of flange plates 4 at their rearward ends.

The transverse support 2 comprises over a significant portion of its length an open in profile member that is open in the direction toward the impact damping members 3. It is configured as a shell construction of a thin-walled metallic upper shell 5 and an identical lower shell 6. A rearwardly extending, longitudinal leg 10 is connected to the upper longitudinal edge 7 and to the lower longitudinal edge 8 of the front stay 9 of the transverse support 2 (see FIG. 4), respectively. This leg 10 is formed as a deformation fold and is characterized by a slantedly extending longitudinal portion 11 and a substantially vertically extending vertical section 12 adjoining the portion 11. The section 12 has a transition at its end into an angled reinforcement flange 13 which is angled substantially at a right angle and extends toward the vehicle frame. As illustrated in FIG. 4, the longitudinal portions 11 are pointing inwardly toward the longitudinal center plane MLE. The slant angle α can be between 5° and 45°, preferably it is between 10° and 35°. In the represented embodiment the angle α is 25° (see FIG. 4). The transitions 14 and 15 are rounded.

The upper shell 5 and the lower shell 6 are of identical cross-sectional configuration. They are identical components which are formed in one and the same tool. This contributes to an economical construction. Moreover, tool costs can be saved. The upper shell 5 and the lower shell 6 are arranged diametrically opposed to one another and are connected to one another along their overlapping longitudinal areas 16 of their end face legs 17.

The transverse support 2 has a crash-optimized shape because of the fold and flange configuration.

Pocket-like receiving members 19 are provided in the transverse support 2 and are matched to the cross-sectional configuration of the end portions 18 of the impact damping members 3 (see also FIG. 3). These pocket-shaped receiving members 19 have length portions 22, 23 extending parallel to the upper side 20 and the underside 21 of the impact damping members 3. The end portions 18 of the impact damping members 3 are inserted into the receiving members 19 and are positive-lockingly secured therein. The upper and lower length portion 22 and 23 of the receiving members 19 have a continuous transition of a substantially S-shaped course 24 into the legs 10.

The impact damping members 3 are also of a two-part shell configuration with upper shell 27 and lower shell 28 connected to one another along the longitudinal edges 25 of their lateral legs 26. The impact damping members 3 have a rectangular cross-sectional geometry with rounded longitudinal areas 29. In the connecting area to the transverse support 2, the horizontal symmetry axis S of the impact damping member 3 (see FIG. 3) extends parallel to the horizontal central longitudinal plane MLE (see FIG. 4) of the transverse support 2. This configuration is characterized by a high transverse stiffness. The impact damping members 3 are open in the direction toward the transverse support 2 as well as toward the longitudinal supports F.

While specific embodiments of the invention have been shown and described in detail to illustrate the inventive principles, it will be understood that the invention may be embodied otherwise without departing from such principles.

What is claimed is:

1. A bumper for a motor vehicle, the bumper comprising:
a transverse support and impact damping members connected to the transverse support, wherein the transverse support is configured to be fastened transverse to longitudinal supports of a motor vehicle frame via the impact damping members;

wherein the transverse support is an open profiled member opening in a direction toward the impact damping members and is comprised of an upper shell and a lower shell;

wherein the transverse support has a front stay with an upper longitudinal edge and a lower longitudinal edge;

wherein the upper longitudinal edge and the lower longitudinal edge each have a leg extending toward the impact damping members, wherein each leg comprises a slanted inwardly extending longitudinal portion a vertical section, and an angled reinforcement flange pointing toward the vehicle frame.

2. The bumper according to claim 1, wherein the upper shell and the lower shell, relative to the longitudinal center plane of the transverse support, are arranged symmetrically to one another.

3. The bumper according to claim 1, wherein the impact damping members have end portions connected to the transverse support, wherein the transverse support has receiving members configured to match a cross-sectional configuration of the end portions of the impact damping members and wherein the end portions are fastened in the receiving members.

4. The bumper according to claim 3, wherein the receiving members are formed by partially widening the legs and have length portions extending parallel to an upper side and a lower side of the impact damping members, wherein the length portions have a continuous transition into the legs of the upper and lower longitudinal edges.

5. The bumper according to claim 1, wherein each of the impact damping members is comprised of two shells.

* * * * *